United States Patent [19]
Olson

[11] 3,820,898
[45] June 28, 1974

[54] MULTI-CHANNEL RADIATION ANALYZER

[75] Inventor: Gaylord G. Olson, Santa Monica, Calif.

[73] Assignee: SSR Instruments Company, Santa Monica, Calif.

[22] Filed: Aug. 30, 1972

[21] Appl. No.: 284,980

[52] U.S. Cl................ 356/82, 356/83, 356/97
[51] Int. Cl............................... G01j 3/36
[58] Field of Search................ 356/82, 83, 97

[56] References Cited
UNITED STATES PATENTS

| | | | |
|---|---|---|---|
| 2,871,465 | 1/1959 | Nielsen | 356/83 |
| 3,317,737 | 5/1967 | Kopsel et al. | 356/82 |
| 3,563,657 | 2/1971 | Kniseley et al. | 356/97 |

OTHER PUBLICATIONS
Optical Multichannel Analyzer; Karasek Research-/Development; Jan. 1972; Vol. 23, No. 1; pg. 47, 48, 50.

*Primary Examiner*—Vincent P. McGraw
*Attorney, Agent, or Firm*—Marvin H. Kleinberg

[57] ABSTRACT

An improved analyzer utilizes electron scanning techniques to examine the spectrum of radiant energy. A comparable spectrum of the background is provided, and the two are alternately scanned.

The spectrum can also be "folded" into a plurality of vertically aligned segments with an adjacent area of corresponding background spectra, and a conventional t v raster scan can be employed. Appropriate processing circuits subtract the background from the signal and store the result. Stored quantities can represent the intensity of incident radiation at each wavelength.

10 Claims, 6 Drawing Figures

PATENTED JUN 28 1974  3,820,898
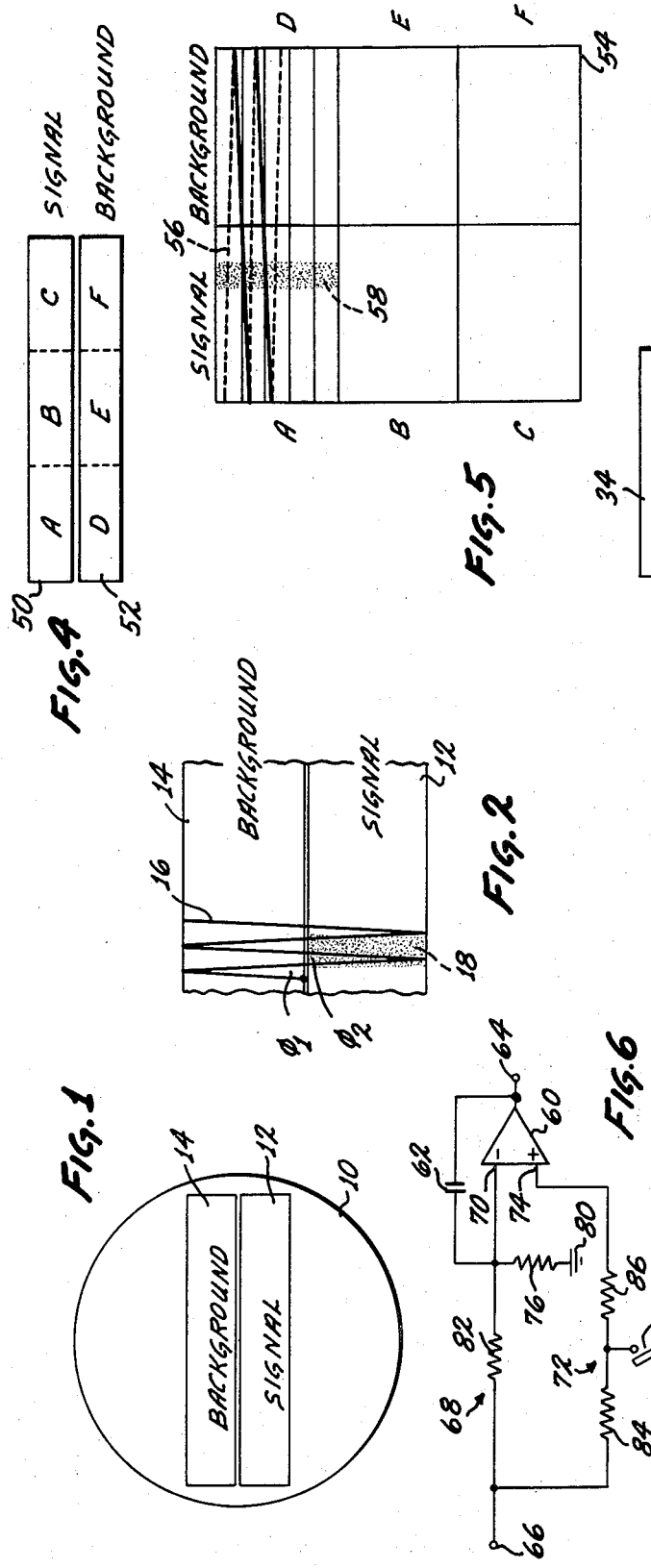

MULTI-CHANNEL RADIATION ANALYZER

BACKGROUND OF THE INVENTION

1. Field of the Invention

The present invention relates to the measurement of radiation and, more particularly, to an improved method and apparatus for measuring the magnitude of the frequency components of a relatively faint radiation source in a "noisy" background.

This application is related to patent application Ser. No. 208,343, filed Dec. 15, 1971, now U.S. Pat. No. 3,748,478, by Paul K. Jensen for "Method and Apparatus for Detecting a Faint Energy Source," assigned to the assignee of the present invention.

DESCRIPTION OF THE PRIOR ART

In the prior art, various techniques have been devised to measure the intensity of relatively faint radiation sources. As pointed out in the above-identified application to Jensen, the several approaches of the prior art have proved to be unsatisfactory in dealing with very faint sources in very noisy backgrounds.

Accordingly, Jensen disclosed an improved method and apparatus for detecting the source which utilizes electronic "chopping." That is, the image of the remote source impinges upon a photosensitive cathode of an image dissector tube, and the image of an adjacent area, without a radiant energy source, impinges upon an adjacent area of the photocathode.

Utilizing computer-type circuits, the system rapidly switched between the two photocathode areas for a predetermined time interval, and the measured intensity was recorded and stored for each area during each scan interval. At the conclusion of the interval, the stored values were differenced, and the remainder represented the intensity of the faint source.

It has been determined that it is not enough to merely determine the intensity of a faint radiating source, but is is desirable to analyze that source for the spectral composition of the radiation emanating therefrom. Alternatively, it is deemed desirable to analyze a transient event such as a lightning flash which has substantial intensity but is of brief duration. It is deemed useful to make a spectroscopic analysis of a source to determine what frequency components are present and the intensity of each. Normally, one could utilize a grating, a prism, or a comb or other device to separate spatially the components of a radiant beam. If the radiation is of microwave or longer wavelengths of electromagnetic radiation, a "tuning" device can be employed to temporally separate the frequency components.

SUMMARY OF THE INVENTION

According to the present invention, an image of a radiant source is dispersed, for example, in a horizontal direction whereby wavelength is a function of displacement in the X direction. Depending upon the resolution desired, the spectrum can be "spread" along a single line or in a plurality of lines, arranged in a column.

In a preferred embodiment, a horizontal band has associated with it a parallel, horizontal band which represents the spread image of the background without the radiant source, for comparison purposes. A sawtooth scan first examines a portion of one band and then the other band, subtracting the background from the signal. The resultant quantity is digitized and stored by a data processing system. Each incremental area of the band has a corresponding memory location in which values corresponding to the intensity of the image at that location are stored. The preferred embodiment has been described by the inventor in an article entitled "Application of an Optical Multichannel Analyzer" in the American Laboratory of February, 1972, and in an article entitled "The Growing Range of Multichannel Detection" in the Jan., 1972 issue of Optical Spectra. A colleague, F. W. Karasek has also described the embodiment in an article entitled "Optical Multichannel Analyzer" in the Jan., 1972 issue of RESEARCH/DEVELOPMENT.

In other embodiments, the entire line corresponding to the source spectrum could be scanned, followed by a scan of the entire line corresponding to the background spectrum. The data processing system could maintain a memory of size sufficient to record a value of intensity for each incremental wavelength of source and background.

In yet alternative embodiments, a spectrum could be divided into a plurality of horizontal bands arranged in a column, with a corresponding column of aligned horizontal bands. The first column represents the spectral distribution of the source, and the second column represents the corresponding spectral distribution of the background. A conventional tv raster scan would then scan a portion of the spectrum of the source and a corresponding portion of the spectrum of the background on each line. Appropriate storage devices would retain and accumulate the values attributed to each incremental area corresponding to an incremental wavelength.

At the conclusion of a scan or a plurality of scans, if the source is very faint, the values stored in the memory corresponding to the background are subtracted from the values in the memory corresponding to the source. The difference represents a magnitude of the intensity of each wavelength component of the radiant source.

Utilizing the techniques of the present invention, it is also possible to compensate for the electrical characteristics of the photodetector system. With the system energized but with no radiation being admitted to the system, the photodetector can be scanned again, and the results processed and stored. At the completion of an interval corresponding to the data acquisiton interval in the presence of radiation, quantities corresponding to the dark current of the sensor can be stored which can subsequently be subtracted from the values stored representing the radiation intensities.

In the event that more sophisticated equipment is utilized to disperse the radiation into its component parts, such as a grating drive spectrometer, it is possible to compensate for the motion of the image by utilizing a memory wherein a memory location corresponds to each incremental area of the scanning device. Suitable addressing techniques assure that the same frequency component is stored in its corresponding memory location, even if the temporal or spatial distribution varies. By maintaining flexibility in the addressing of the store, temporal scanning could be accomplished of a spectrum which is presented at a fixed target and which traverses the target at a predetermined speed.

Other embodiments could be employed in such varied applications as spectroscopy, flash photolysis, absorption spectrophotometry, arc, spark, or flame spectrometry as well as gas chromotography or mass spectrometry. It is also possible to include a special analysis of such rapidly occuring events as explosions, flares, and rocket or combustion motors.

The novel features which are believed to be characteristic of the invention, both as to organization and method of operation, together with further objects and advantages thereof, will be better understood from the accompanying drawings in which several preferred embodiments of the invention are illustrated by way of example. It is to be expressly understood, however, that the drawings are for the purpose of illustration and description only and are not intended as a definition of the limits of the invention.

BRIEF DESCRIPTION OF THE DRAWINGS

FIG. 1 is an idealized view of a photodetector with the active area subdivided into an impinging signal area and an impinging background;

FIG. 2 is a somewhat idealized view of an enlarged segment of the detector of FIG. 1, illustrating a typical scan pattern;

FIG. 3 is a block diagram of a preferred embodiment of a system according to the present invention;

FIG. 4 is a diagram of an expanded signal spectrum and corresponding background spectrum;

FIG. 5 is an idealized view of a photodetector with the spectra of FIG. 4 rearranged thereon and a scan pattern therefor; and FIG. 6 is an idealized circuit diagram of a reversible integrator circuit for processing each scan.

DESCRIPTION OF THE PREFERRED EMBODIMENTS

Turning first to FIG. 1, a photocathode 10 is shown upon which is focused an image of a spectrum from a radiant source in a first or signal band 12. The background is dispersed in a second, background spectral band 14, aligned adjacent therewith. Appropriate input optics would include a spectrometer or other device for providing a spectrum. The height of the band corresponds to the height of the spectroscope slit.

As viewed in FIG. 1, the wavelength of the image is a function of the displacement along the horizontal axis. Other image patterns can be employed as well as other detectors. For example, the images could be moved relative to the photocathode 10, and a portion of the spectra would be examined with each scan. If the scan rate is high enough and the motion of the image is slow enough, a vastly magnified spectrum could be scanned with accuracy. Alternatively, second and third order spectral lines would also be examined with precision.

Turning next to FIG. 2, there is illustrated a preferred scan for the image upon the photocathode 10 of FIG. 1. As in FIG. 1, the signal spectral band 12 is aligned below the background spectral band 14. The scanning circuits are arranged to provide a vertically oriented sawtooth scan. The scan starts between the bands and proceeds to the top of the background band 14 and then to the bottom of the signal band 12 and repeats.

The resolution of the photocathode is such that the scan covers all of the sensitive elements and would therefore utilize all of the radiation impinging upon the detector. Further, each scan is subdivided into a phase 1 during which the scan is in the background spectra 14 and a phase 2 in which the scan is in the signal spectrum 12.

Suitable integrating and timing circuits process the photodetector output signal to subtract an integrated signal corresponding to a phase 1 interval from the integrated signal corresponding to a phase 2 interval on the same scan. The resulting signal could be considered the net signal and is digitized and stored in a memory.

In a preferred embodiment, the sawtooth scan was arranged to sweep the image in 500 scans, each corresponding to a scan interval. Approximately 12 scan intervals were provided for a retrace to start a new sweep of the photocathode 10. A memory associated with the apparatus provided 500 "words" in which were stored binary coded decimal numbers representing the net signal for each scan. A resolution of 1.5 angstroms per scan has been achieved in one embodiment, and that resolution can be increased by suitable choice of dispersing apparatus and imaging optics.

In FIG. 3, a block diagram of a typical system according to the present invention is set forth. A source of radiant energy 20 impinges upon an Imaging System 22 which can include the spectrum generating apparatus. In the preferred embodiment, a spectrometer is used to develop the spectrum. The Imaging System 22 applies this signal spectrum and a corresponding background spectrum to a Detecting Element 24.

The signal output from the Detecting Element 24 is applied to a Processor and Analog-to-Digital Converter unit 26. A precision clock 28 provides the basic timing for the system and applies precisely measured clock impulses to a Control Unit 30.

The Control Unit 30 directs the operation of the detector and provides the necessary deflection signals to the Detecting Element 24, depending upon the type of detector. A vidicon tube is employed in the preferred embodiment. The Control Unit 30 furnishes the Processor and Analog-to-Digital Converter unit 26, with signals which indicate whether the Detecting Element 24 output signals correspond to scan phase 1 or scan phase 2 signals.

The Control Unit 30 also applies signals to a switch 32 which alternatively connects the Processor and Analog-to-Digital Converter 26 to a first Memory I 34 or a second Memory II 36.

In operation, during the first mode, the image from the radiant source 20 is permitted to impinge upon the photodetector together with the background image. The image is then scanned for a predetermined, timed interval. After each sweep of the bands, a digitized quantity is stored in the memory corresponding to the intensity of impinging radiation, averaged for each scan over phase 1 and phase 2. A differencing operation for each scan provides a net signal in accordance with the teachings of Jensen, supra. The radiant intensity at any given wavelength can then be represented by the average net signal at each scan which is then digitized and stored. In the first mode of operation, the digitized signal is stored in Memory I 34.

After a predetermined interval of analysis of the energy from the source 20, a shutter or mask (not shown) can be placed in front of the imaging system 22. The switch 32 is controlled to couple the Processor and Analog-to-Digital unit 26 to Memory II 36. The system is then permitted to operate in the second mode for a comparable calibrating interval, with no external images being applied to the Detecting Element 24.

At the end of the calibrating interval, Memory II 36 will have stored therein digitized signals corresponding to the magnitude of the dark current or baseline of the entire system at each wavelength. The contents of the second, Memory II 34, are subtracted from the contents of the first Memory I 32 in an Arithmetic Unit 38 and the result can be applied to a suitable Display Device 40.

In FIG. 4, there is shown a spectral band corresponding to an applied radiant signal 50 and a second, comparable, spectral band 52 corresponding to the background. As shown in FIG. 4, the signal spectral band 50 is subdivided into segments labeled "A," "B" and "C." Correspondingly, the background spectral band is subdivided into segments labeled "D," "E" and "F."

In FIG. 5, the elements of the spectral bands 50, 52 of FIG. 4 are shown rearranged on a photodetector 54 wherein segments A, B and C of spectral band 52 are also vertically aligned.

A scanning trace 56 then sweeps from left to right and retraces in a more or less conventional tv raster scan. A plurality of scan lines will be required to completely cover band segments A and D. As shown, a spectral line 58 will be encountered in each of the sweeps and at substantially the same time in each sweep.

If the clock is synchronized to the horizontal sweeps, the signal output of the photodetector at any instant can be stored in the memory in a corresponding location. Similarly, the background half of the sweep is also time synchronized so that each incremental area corresponds to a different memory location. The contents of the two locations representing the same wavelength can be differenced, either after each sweep or after a complete scan of the spectral band portions.

Similarly, with segments B and E and C and F.

Suitable clock and control circuits can synchronize the memory to the scan so that the output signal of the detector corresponding to each increment of wavelength can be stored in a separate memory location.

Turning finally to FIG. 6, there is shown an exemplary integrator circuit which is useful with the preferred embodiment of the present invention and would form a portion of the Processor and Analog-to-Digital unit 26 of FIG. 3. As shown, an operational amplifier 60 has its output connected to an integrating capacitor 62 as well as an output terminal 64. The input signal is received at an input terminal 66 and is applied to a first parallel branch 68 which connects to the "minus" input terminal 70 of the operational amplifier 60. The second branch 72 is coupled to the "plus" input terminal 74 of the operational amplifier 60. The integrating capacitor 62 is connected to the first branch 68 and the branch is connected through a first resistor 76 to a source of common reference potential 80, indicated by the conventional ground symbol.

A second resistor 82 is interposed between the "minus" terminal 70 and the input terminal 66. In the second branch 72, a third resistor 84 couples the input terminal 66 into a fourth resistor 86, which is connected to the plus terminal 74 of the operational amplifier 60. The junction of third and fourth resistors 84, 86 is connected through a switch 88 to common reference potential 80.

In operation, a positive signal applied at the input terminal 66 will cause a negative signal to appear at the output terminal 64 with switch 88 closed and a positive signal to appear at the output terminal 64 with the switch 88 open. With switch 88 closed, a negative charge is stored in the integrating capacitor 62 and, with the switch 88 open, an input signal of comparable magnitude will provide an equal but oppositely poled signal to the integrating capacitor 62 which would tend to discharge the capacitor. If then the Detecting Element 24 circuits receive comparable illumination during phase 1 and phase 2, the net signal on the integrating capacitor 62 should be zero. However, if incident radiation is detected, a positive signal can be stored during phase 1 and, at the conclusion of phase 1, the position of the switch 88 is changed, the signal stored on the integrating capacitor 62 would be decreased by the amount of radiation detected during phase 2 of the scan.

At the completion of each scan cycle including phase 1 and phase 2, the content of the integrating capacitor 62 can be applied to suitable analog-to-digital converting circuits and a multi-digit number, representing the magnitude of the signal stored on the integrating capacitor can be placed in a digital store. The number so stored will include an appropriate sign to identify whether the signal from the image or background was the greater.

Thus, there has been shown an improved method and device for analyzing the composition of a radiant source including an improved method and apparatus for analyzing the spectrum of faint or transient phenomena.

In a preferred embodiment, a vidicon tube utilizing more or less conventional tv techniques can be employed to provide an accurate determination of the spectral distribution of any incident radiation. In a preferred embodiment a portion of the spectrum can be resolved into 500 increments, each of which can be scanned more than 30 times per second. Further, each spectral increment can be averaged and differenced against the background before digitizing to provide a high-speed data processing capability.

The same system can be used to calibrate and compensate for background noise and dark current effects within the electronic system itself by operating without an input signal for a predetermined period of time. In a preferred embodiment, a separate memory is provided for this calibration phase and the contents of the second memory can be subtracted from the contents of the first memory to provide a display corresponding to and representative of the net incident radiation.

While some applications have been suggested, it is clear that many other applications will appear to those skilled in the art and further, it will be possible to make simple modifications and changes to the disclosed embodiment while remaining within the teachings of the present invention. Accordingly, the invention should be limited only by the scope of the claims appended hereto.

What is claimed as new is:

1. The method of determining the magnitudes of the spectral components of a radiant source comprising the steps of:

a. dispersing a first, radiant source into spectral components;

b. dispersing a second, background source into spectral components;

c. scanning the spectral components of said first and second sources alternately to produce signals corresponding to and representative of the magnitude of the impinging images;

d. differencing the magnitudes of first and second source images for each spectral component;

e. storing a resultant value of magnitude for each spectral component; and f. displaying the resultant value of magnitude for each spectral component.

2. The method of claim 1 above, further including the steps of:

g. repeating steps (c) and (d) in the absence of impinging sources;

h. storing the resultant value for each spectral component in the absence of impinging sources, representing system errors;

i. differencing the values stored in step (e) with the values stored in step (h) and storing the value resulting therefrom; and j. displaying the values obtained from step (i) above, corresponding to system error-free resultant values of magnitude for each spectral component.

3. In combination with means for dispersing a radiant source into its spectral components, apparatus for determining the magnitude of the spectral components which compose the radiant source, comprising:

a. image detection means adapted to receive a first spectrally dispersed image of the radiant source and a second, background image lacking a radiant source, similarly dispersed spectrally;

b. scanning means connected to said image detection means for alternating between the radiant source and background images to provide signals corresponding to and representative of the magnitude of image intensity of each spectral component; and c. data processing means coupled to said image detection means for deriving a resultant signal corresponding to and representative of the difference in image magnitude between first and second images at each spectral component, including storage means for storing each of the resultant signals corresponding to the spectral components.

4. The apparatus of claim 3, above, further including display means coupled to said storage means for providing a visual display of the magnitudes of the spectral components composing the radiant source.

5. The apparatus of claim 3, above, wherein the radiant source is a light source and said scanning means include a photo sensitive image detector.

6. The apparatus of claim 3 wherein said data processing means include digitizing means for quantizing said resultant signals into digital form and said storage means include means for storing magnitude representing digits in separate locations, each corresponding to a spectral component.

7. The apparatus of claim 3 wherein said storage means include a separate store for holding magnitude representing digits and further including switching means for alternatively storing magnitude representing digits in said storage means and said separate store whereby in a first mode said apparatus stores magnitude representing digits resulting from scanning applied images and in a second mode said apparatus stores separately, magnitude representing digits resulting from scanning in the complete absence of impinging images.

8. The apparatus of claim 3, further including timing and synchronizing means coupled to said scanning means and said data processing means for temporally identifying each spectral component scanned with a corresponding location in said storage means.

9. Apparatus of claim 8 wherein said data processing means include switching means and differencing means coupled to said timing and synchronizing means for differencing the magnitude representing signals corresponding to the first and second source images to provide said resultant signal.

10. Apparatus for detecting and measuring the magnitude of a radiant source comprising:

a. radiation sensitive detecting means responsive to impinging radiation for producing a signal corresponding to and representative of the intensity of impinging radiation;

b. imaging means for causing the radiation emanating from a radiant source to impinge upon said detecting means as a first image, together with radiation source from an area adjacent the radiant as a second image source;

c. spectrum spreading means interposed between the source and said detecting means for decomposing impinging radiant energy into the frequency components thereof;

d. data acquisition and storage means coupled to said detecting means and said imaging means for storing the signals representing radiation intensity for each frequency component of radiant source radiation and adjacent area radiation; and e. data processing means for determining the difference in magnitude between the signals corresponding to the frequency components of the radiant source and the signals corresponding to the frequency components of the area adjacent the radiant source, the differences representing the magnitude of the source at each of the frequency components.

* * * * *